Inventor
Klaus Taubert
by Michael J. Striker
Atty

United States Patent Office 3,405,390
Patented Oct. 8, 1968

3,405,390
SELECTION CONTROL CIRCUIT FOR ADDRESSING COMPONENTS OF A DATA PROCESSING SYSTEM
Klaus Tauchert, Villingen, Germany, assignor to Kienzle Apparate GmbH., Villingen im Black Forest, Germany
Continuation of application Ser. No. 474,395, July 23, 1965. This application Oct. 30, 1967, Ser. No. 679,264
Claims priority, application Germany, July 25, 1964, K 53,564
12 Claims. (Cl. 340—146.2)

ABSTRACT OF THE DISCLOSURE

An arrangement for moving a mechanical apparatus from one position to another position, in accordance with the directions of a digital code. The first or old position is stored in digital binary form by one set of switches. A second set of switches receives the new address, also transmitted in binary form. The old and the new address are compared to determine whether the magnitude of the new address is greater, smaller, or equal to the magnitude of the old address. Appropriate signals are derived from the comparison procedure to drive the mechanical apparatus to the new position corresponding precisely to the new address.

---

This application is a continuation of application Ser. No. 474,395 filed July 23, 1965, now abandoned.

The present invention relates to a circuit arrangement for address control of a mechanical component in electronic or electro-mechanic data processing machines.

In electronic or electromagnetic data processing systems, it is often necessary to move a mechanical component from one position to another position. The initial or old position in such cases represents an old or previous address, whereas the new position, to which the part is to be moved, represents a new address.

Suppose, for example, that a specified columnar position of the carriage such as, for example, the printing or typing carriage of an accounting machine is to be selected. The carriage of the accounting machine may have been stopped for a specified operation in column 2 of an accounting form, and may then have to be moved to column 15 to accomplish specified operations there. After that, the carriage may have to be moved to column 10.

Another example is the calling up of mechanical registers in accordance with a predetermined program. Mechanical registers are often positioned on a drum. It may be desired to select in a specified position of the carriage, for example, the register 15, then register 24 and then register 2. It may also be desired to operate or tabulate a printing device in accordance with a predetermined program along a stationary printing platen or other guide means for the paper to be printed.

In all such cases it is necessary to position a mechanical component driven, for example, by a motor, to selected positions in accordance with address information or data delivered in a certain programmed sequence by the electronic computer or by electro-mechanic computing devices. It is desirable, for example, to control the movement of the accounting machine carriage from the column 15 directly to the column 10, or from the column 2 directly to the column 24, depending upon the requirement of the programmed accounting operations. It is thus necessary to control the rotational or tranlatory movement of a mechanical component in dependence upon specific address information, and in such a manner that the mechanical component moves to the position corresponding to the new address via the shortest possible path.

The object of the present invention is to provide a new and improved circuit arrangement for data processing machines to control movement of a mechanical part in response to an address via the shortest possible path in one or the other direction.

In accordance with the present invention, this circuit arrangement comprises:

(a) driving means for the said mechanical component;
(b) address control means moved in synchronism with said mechanical component;
(c) a first set of address switches representing the old address in coded form and adapted to be operated by said address control means;
(d) a second set of address switches representing the new address to be reached;
(e) comparing means for comparing the settings of said first and second set of address switches;
(f) a first control switch to be operated by said comparing means and to arrest said mechanical component in case of address parity;
(g) a second control switch to be operated by said comparing means and to control movement of said mechanical component in one direction when the old address is smaller than the new address;
(h) a third control switch to be operated by said comparing means and to control movement of said mechanical component in the other direction, when the old address is bigger than the new address.

In order that the present invention may be readily carried into effect, it will now be described with reference to the accompanying drawing, wherein.

In the figures, the same components are identified by the same reference numerals.

Figure 1:
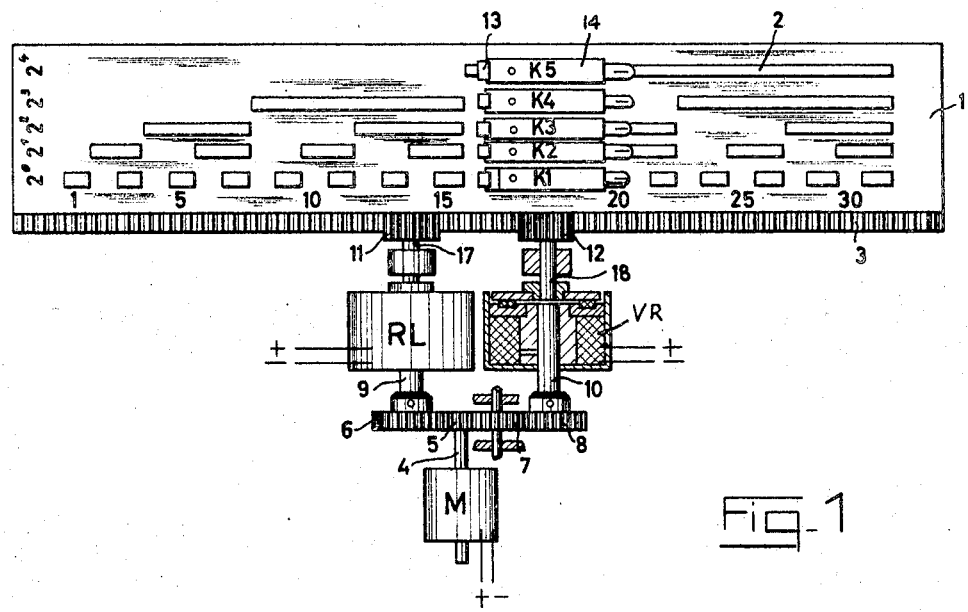
FIG. 1 is a schematic diagram of an embodiment of the mechanical portion of the control circuit arrangement of the present invention.

IN FIG. 1 which illustrates the mechanical portion of the circuit arrangement of the present invention an address control means in the form of a control panel 1 comprises control portions, stops, segments or strips 2 and teeth 3. The teeth 3 are positioned along an edge of the control panel 1 and are utilized to move said panel to the right or to the left when engaged by drive gears. The control panel or plate 1 may comprise any suitable plate or support member which supports the control portions 2 in rows extending parallel to the length of said panel and spaced from each other and in columns extending substantially perpendicular to the length of said panel and spaced in accordance with the individual address positions to be taken up by the mechanical component. The control portions 2 are arranged in the normal binary code.

Other control portions, not shown in the drawings control the operation of an accounting or similar type machine such as, for example, a printer or teletype machine. In order to accomplish this, the control panel 1 is either directly connected to the carriage of the accounting or similar type machine or is driven in synchronism with said carriage, so that the position of said control panel always corresponds to the position of said carriage.

The control panel 1 may also be the unrolled representation of a control drum. In such a case, the control drum would be connected to a register drum or otherwise driven in synchronism with such register drum and would be revolved about its axis in clockwise or counterclockwise direction to select the individual registers of the register drum for cooperation with the differential actuators of the accounting machine. The control panel 1 may also be connected to a punched card moving device which moves punched cards into a selected position. Also the control panel 1 may be utilized to control the movements of a printing head along a stationary paper platen or other paper guide means.

The control portions 2 are affixed to the control panel 1 in binary code, wherein the lowest row represents $2^0$ or 1, the next higher row represents $2^1$ or 2, the middle row represents $2^2$ or 4, the next to the highest row represents $2^3$ or 8, and the highest row represents $2^4$ or 16. This permits a broad control range with a minimum control portions. Any suitable code, other than binary, may be utilized.

The control portions 2 need not be of the mechanical type, but can be of such nature as to be sensed by photoelectric or magnetic means. Thus, for example, the control panel 1 may comprise a material such as, for example, plastic, paper, cardboard or the like, and the control portions 2 may comprise opaque or translucent material if the material of the control plate is translucent or opaque, so that the light-conductivity of the control portion is opposite that of the control panel. Also, the control panel 1 may be black or white and the control portions 2 may be of the other color. Furthermore, the control panel 1 may be of magnetizable material and the control portions 2 may be magnetized portions thereof, or the control panel may be of any suitable supporting material and the control portions 2 may be of magnetized magnetizable material. Regardless of the nature of the control panel and control portions, each code or column position corresponds to or represents a specific position of the mechanical part or component, which is not shown in the figures.

The mechanical component is driven by driving means such as motor M. A small gear 5 is secured to the motor shaft 4 and meshes on one side with a gear 6 and on the other side with a gear 8 through an intermediate gear 7. The motor M thus drives a shaft 9 on which is mounted the gear 6, or a shaft 10 on which is mounted the gear 8. Two gears 11 and 12 are positioned on shafts 17 and 18, respectively, and may be coupled through respective electromagnetic couplings or clutches RL and VR with the shafts 9 and 10, and thereby with the gears 6 and 8, respectively.

If the magnetic clutch or coupling RL is engaged, the motor M drives the mechanical component including the control panel 1 via the gear 6, the shaft 9, the shaft 17, and the gear 11 which meshes with the teeth 3 of said control panel 1 to the right or in reverse (clockwise) direction. If the clutch or coupling VR is engaged, the motor M drives the mechanical component including the control plate 1 via the intermediate gear 7, the gear 8, the shaft 10, the shaft 18 and the gear 12 which meshes with the teeth 3 of said control plate, to the left or in forward (counter-clockwise) direction.

Figure 2:
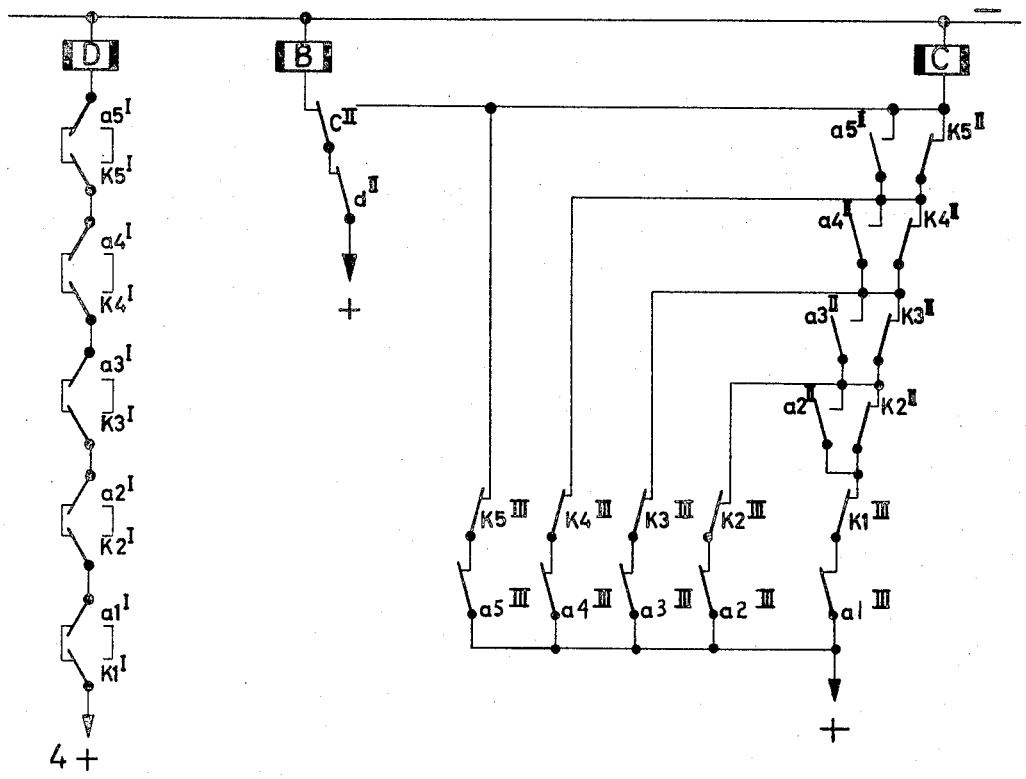
FIG. 2 is a circuit diagram mainly of the address comparing portion of the circuit arrangement of the present invention.

A first set of address switches K1, K2, K3, K4 and K5 are positioned above the control portions 2 of the control panel 1. Each of the address switches K1 to K5 comprises several contact pairs as shown in FIG. 2. The switch K1 comprises a double pole contact $K1^I$ and a rest contact $K1^{III}$. Each of the switches K2, K3, K4 and K5 comprises a double pole contact $K2^I$, $K3^I$, $K4^I$ and $K5^I$ and two rest contacts $K2^{II}$, $K3^{II}$, $K4^{II}$, and $K5^{II}$ and $K2^{III}$, $K3^{III}$, $K4^{III}$ and $K5^{III}$. These contacts are operated by rollers 13, for example, each of which is positioned at the end of a contact spring 14 on each of the address switches K1, K2, K3, K4 and K5. Each of the rollers 13 abuts the corresponding one of the control portions 2 to operate its contacts.

If the control panel 1 and the control portions 2 have a translucent-opaque relationship, the control portions are sensed photoelectrically whereas, if the control portions are of magnetic type, the switches K1 to K5 then corre-sponds to the initial or old address, this address being stored in the switches K1 to K5.

Figure 3:
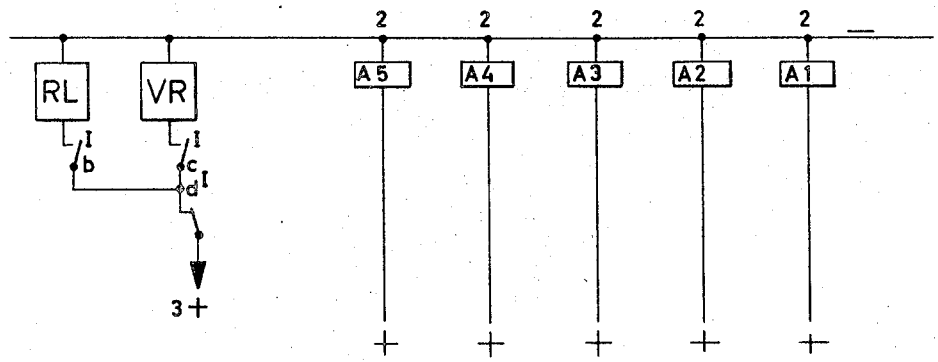
FIG. 3 is a circuit diagram showing other parts of the circuit arrangement of the present invention.

The new address may be provided by an electronic calculating device, for example. Such a calculating device may provide the new address through its internal programming by instructing: "Write the result of the storage device 5 in column 25 of the carriage." A specific combination of a second set of address switches, namely the address relays A1, A2, A3, A4 and A5, which store the new address input, are then energized in accordance with the ordinary binary code of the new address (FIG. 3)

As shown in FIG. 2, the address relay A1 operates a double pole contact $a1^I$ and a make contact $a1^{III}$. Each of the address relays A2, A3, A4 and A5 operates one double pole contact $a2^I$, $a3^I$, $a4^I$ and $a5^I$ and two make contacts $a2^{II}$, $a3^{II}$, $a4^{II}$ and $a5^{II}$ and $a2^{III}$, $a3^{III}$, $a4^{III}$ and $a5^{III}$.

FIG. 2 illustrates all the contacts which form comparing means and shows the contents $a1^I$ to $a5^I$ and the contacts $K1^I$ to $K5^I$ connected in the energization circuit of a relay D being the first control switch. The contacts $a1^{III}$ to $a5^{III}$, $K1^{III}$ to $K5^{III}$, $K2^{II}$ to $K5^{II}$ and $a2^{II}$ to $a5^{II}$ are connected in the energization circuit of a relay C being the third control switch. One contact $C^{II}$ of the relay C and one contact $d^{II}$ of the relay D are connected in the energization circuit of a relay B, being the second control switch. If the old address and the new address are identical, the relay D is that which is energized. If the new new address is larger than the old address, the relay C is that which is energized. If the new address is smaller than the old address, the relay B is that which is energized. As shown in FIG. 3, a contact $d^I$ of the relay D, a contact $c^I$ of relay C and a contact $b^I$ of the relay B are connected in the energization circuits of the magnetic clutches RL and VR, the contact $d^I$ being common to both, the contact $b^I$ being in the energization circuit of the clutch RL with the contact $d^I$ in series and the contact $c^I$ being in the energization circuit of the clutch VR in series with the contact $d^I$.

In FIG. 1, the control panel 1 is illustrated as being positioned at column 16. In column 16, only the switch K5 is actuated because the binary representation, indicated by the control portions 2, are 0000 and 1 for the highest row, which is $2^4$ or 16. The position of the switches K1 to K5 for the old address is thus:

K5 ---------------------------------------------- 1
K4 ---------------------------------------------- 0
K3 ---------------------------------------------- 0
K2 ---------------------------------------------- 0
K1 ---------------------------------------------- 0

If the new address is column 25, the relays A1, A4 and A5 are actuated because the binary representation of 25 is 11001, which are $2^0$ or 1, $2^3$ or 8, and $2^4$ or 16 which total 25. The energization of the relays A1 to A5 for the new address is thus:

A5 ---------------------------------------------- 1
A4 ---------------------------------------------- 1
A3 ---------------------------------------------- 0
A2 ---------------------------------------------- 0
A1 ---------------------------------------------- 1

Thus, in the lower row of the circuit of the relay C of FIG. 2, the contacts $a1^{III}$, $a4^{III}$, $a5^{III}$ would be closed, and the contacts $a2^{III}$ and $a3^{III}$ would be open. In the second row from the bottom of the circuit of the relay C of FIG. 2, the contacts $K1^{III}$, $K2^{III}$, $K3^{III}$ and $K4^{III}$ would be closed and only the contact $K5^{III}$ would be open. In the third, fourth, fifth and sixth rows from the bottom of the circuit of the relay C of FIG. 2, the contacts $K2^{II}$, $K3^{II}$, $K4^{II}$ would be closed and only the contact $K5^{II}$ would be open. The contacts $a2^{II}$ and $a3^{II}$ would be open and the contacts $a4^{II}$ and $a5^{II}$ would be closed.

Current would thus flow from the positive polarity terminal of the voltage supply source via the contact $a1^{III}$, $K1^{III}$, $K2^{II}$, $K3^{II}$, $K4^{II}$, $a5^{II}$ and relay C to the negative polarity terminal of the voltage supply source. The relay C would thus be energized and would move the contact $c^{II}$ of the circuit of the relay B to the right so that the positive polarity terminal ++ and the contacts $c^{II}$ and $d^{II}$ would then function as a self-holding circuit for the relay C. Also, the relay B would be deenergized by the movement to the right of the contact $c^{II}$. The relay B is preferably a delayed action relay so that the relay C is energized before the relay B, when the new address is larger than the old address.

When the relay C is energized, it closes the contact $c^{I}$ in the circuit of the clutch VR so that the clutch VR is energized via the positive polarity terminal 3+ of the voltage supply source, the contacts $c^{I}$ and $d^{I}$ and the negative polarity terminal. When the electromagnetic clutch VR is energized, it couples the motor M to the gear 12 which then moves the mechanical component and the control panel to the left or in the forward direction; the forward direction being that in which the addresses become larger.

During movement of the control panel 1, the switches K1 to K5 are, of course, opened and closed again. This does not, however, influence the relay C because such relay is energized via its self-holding circuit: $c^{II}$ and $d^{II}$. As soon as the switches K1 to K5 reach the same positions as the contacts of the relays A1 to A5, that is, as soon as the old and new addresses are identical, the relay D is energized, because at such time the contacts $a1^{I}$ and $K1^{I}$ as well as all the other contacts $K2^{I}$, to $K5^{I}$ and $a2^{I}$ to $a5^{I}$ have reached the same position so that the relay D energization circuit is closed from the positive polarity terminal 4+ to the negative polarity terminal (−) of the voltage supply source.

When the relay D is energized, it opens the contacts $d^{I}$ and $d^{II}$, so that relay C and coupling VR are deenergized. The relay C then remains deenergized, because in each position a K rest contact and a make contact are connected in series and both such contacts always move to their opposite switching positions when the old and new addresses are identical. Simultaneously, the opening of contact $d^{I}$ deenergizes the electromagnetic clutch VR, so that the coupling to the gear 12 is disengaged. When the electromagnetic clutch VR is deenergized, it may be made to actuate a brake or the like to engage the gear 12 to provide an immediate stop to the control panel 1 and the mechanical component whose movement is controlled.

If the new address is smaller than the old address, for example, when the control panel 1 and the mechanical component are to be moved from the position 16 to the position 5, the address switches K1, K2, K3, K4 and K5 and the address relays A1, A2, A3, A4 and A5 are positioned as follows:

| | |
|---|---|
| K5 | 1 |
| K4 | 0 |
| K3 | 0 |
| K2 | 0 |
| K1 | 0 |
| A5 | 0 |
| A4 | 0 |
| A3 | 1 |
| A2 | 0 |
| A1 | 1 |

The contacts $K5^{III}$, $K5^{II}$ would be open and the contacts $K1^{III}$, $K2^{III}$, $K3^{III}$ and $K4^{III}$ and $K1^{II}$, $K2^{II}$, $K3^{II}$ and $K4^{II}$ would be closed. Contacts $K5^{I}$ would be changed to its opposite position, while contacts $K1^{I}$, $K2^{I}$, $K3^{I}$ and $K4^{I}$ would remain in their previous position. Also, the contacts $a1^{II}$ and $a1^{III}$ as well as the contacts $a3^{II}$ and $a3^{III}$ would be closed. Contacts $a1^{I}$ and $a3^{I}$ would be changed to their opposite position, while contacts $a2^{I}$, $a4^{I}$ and $a5^{I}$ would remain in their previous position. Since the contact $K1^{I}$ remains unmoved, but the contact $a1^{I}$ is moved to the right, the relay D is deenergized. This indicates that there is no identity between the old an the new address.

In the lower part of the energization circuit of the relay C the contacts $a3^{III}$ and $a1^{III}$ are closed and the contacts $K3^{III}$ and $K1^{III}$ are closed. However, since the contacts $K5^{II}$ and $a5^{II}$ are open, the relay C remains deenergized. Since the relays C and D are unenergized the energization circuit of the relay B remains closed, so that the relay B is energized. Energization of the relay B closes the contact $b^{I}$ of the circuit of the clutch RL so that clutch RL is energized via the positive polarity terminal 3+ of the voltage supply source, the contacts $b^{I}$ and $d^{I}$ and the negative polarity terminal (−). When the electromagnet clutch RL is energized, it couples the motor M to the gear 11 which then moves the mechanical component and the control panel to the right or in the reverse direction; the reverse direction being that in which the addresses become smaller.

During movement of the control panel 1, the switches K1 to K5 are opened and closed until said switches reach the same positions as the contacts of the relays A1 to A5, that is, until the old and the new addresses are identical. The relay D is then energized, because at such time the contacts $a1^{I}$, $a2^{I}$, $a3^{I}$, $a4^{I}$ and $a5^{I}$ and the contacts $K1^{I}$, $K2^{I}$, $K3^{I}$, $K4^{I}$, and $K5^{I}$ have reached the same position and close the energization circuit of the relay D. When the relay D is energized, it opens the contacts $d^{I}$ and $d^{II}$, so that relay B and electromagnetic clutch RL are deenergized. This stops the control panel 1 and the mechanical component in the new address position.

The number of selectable addresses may be increased to any desired extent. For each additional binary position, an additional switch K and an additional relay A with their comparing contacts, is required. The relays A may be replaced by bistable multivibrators or triggers or the like, and the triggers may be controlled by photoelectric cells instead of the switches K1 to K5.

While the invention has been described by means of specific examples and in a specific embodiment, I do not wish to be limited thereto, for obvious modifications will occur to those skilled in the art without departing from the spirit and scope of the invention.

What I claim is:

1. A circuit arrangement for address control for moving a mechanical member, for controlling a printing operation in data processing apparatus, from a first position corresponding to an old address to a second position corresponding to a new address, said circuit arrangement comprising, in combination, driving means for moving said mechanical member from a first position at which said mechanical member is located to a desired second position; address control means mounted on said mechanical member and subdividing the range of motion of said mechanical member into a plurality of increments each being uniquely represented by a coded arrangement of said address control means; a first set of address switches located within the path of said address control means mounted to said mechanical member and actuated by said address control means for providing a digitized electrical signal in coded form representing the incremental position of said mechanical member, said first set of address switches being uniquely actuated by said address control means for each subdivided increment within the range of motion of said mechanical member; a second set of address switches arranged to provided a digitally coded signal representing the new address in coded form, said new address corresponding to an incremental position of said mechanical member within its range of motion; comparing means including portions of said first set of address switches and said second set of address switches for comparing the first and second positions; first control means connected to said comparing means and coupling said driving means to said mechanical member when actuated by a signal from said comparing means, said first control means causing said driving means to drive said mechanical member in a first direction when the old address is smaller than the new address; second control means connected to said comparing means and coupling said driving means to said mechanical member when actuated by a signal from said comparing means for driving said mechanical member in a second direction opposite to said first direction when the old address is larger than the new address; and third control means connected to said comparing means and inhibiting said driving means from moving said mechanical member when the old address is the same as the new address.

2. A circuit arrangement as defined in claim 1, wherein said first direction corresponds to ascending numerical magnitude of said address control means and said incremental positions of said mechanical member, and said second direction corresponds to descending numerical magnitude of said address control means.

3. A circuit arrangement as defined in claim 2, wherein said first and second control means comprise electromagnetic coupling means.

4. A circuit arrangement as defined in claim 3, wherein said electromagnetic coupling means is an electromagnetic clutch.

5. A circuit arrangement as defined in claim 2, wherein said third control means comprises an electromagnetic relay.

6. A circuit arrangement as defined in claim 1, wherein said address control means comprises a plurality of mechanical stops arranged on said mechanical member so as to represent each incremental position of said mechanical member in coded form.

7. The circuit arrangement as defined in claim 6, wherein said coded form is the binary code.

8. The circuit arrangement as defined in claim 6, wherein said mechanical stops comprise structural members supported by said mechanical member and adapted to contact physically said first set of address switches.

9. The circuit arrangement as defined in claim 1, wherein said address control means comprises light control means and said first set of address switches comprises photosensitive means positioned to receive light passing said light control means.

10. The circuit arrangement as defined in claim 1, wherein said address control means comprises magnetizable means and said first set of address switches comprises magnetically responsive means.

11. The circuit arrangement as defined in claim 1, wherein said second set of address switches comprises a plurality of relays.

12. The circuit arrangement as defined in claim 1, wherein said second set of address switches comprises a plurality of electronic switching means.

References Cited

UNITED STATES PATENTS

| | | | |
|---|---|---|---|
| 3,098,187 | 7/1963 | Sciaky | 318—162 |
| 3,172,026 | 3/1965 | Schuman | 318—28 |
| 3,232,404 | 2/1966 | Jones | 197—49 |
| 3,251,039 | 5/1966 | Dupy et al. | 340—172.5 |

MALCOLM A. MORRISON, *Primary Examiner.*

V. SIBER, *Assistant Examiner.*